Aug. 11, 1942.   H. RINIA   2,292,481
DEVICE FOR SCANNING CONTINUOUSLY MOVING FILMS
Filed Jan. 24, 1939

INVENTOR
HERRE RINIA
BY
ATTORNEY

Patented Aug. 11, 1942

2,292,481

UNITED STATES PATENT OFFICE 2,292,481

DEVICE FOR SCANNING CONTINUOUSLY MOVING FILMS

Herre Rinia, Eindhoven, Netherlands, assignor, by mesne assignments, to Radio Corporation of America, New York, N. Y., a corporation of Delaware Application January 24, 1939, Serial No. 252,539
In the Netherlands January 26, 1938

4 Claims. (Cl. 178—7.6)

This invention concerns the scanning of a continuously moving film with which at least a part of the film-pictures is at least twice scanned, whether or not interlaced, in order to reduce flicker of the reproduced picture. A system of this kind is known in which a spot of light projected by a light source on to the film executes a movement opposite the direction of motion of the film, which movement will be called "vertical movement." For this purpose it has already been suggested to use a scanning disc wherein the apertures are arranged in two or more spirals.

The manufacture of such a scanning disc is confronted with serious difficulties and therefore the invention has for its purpose to enable the scanning of a film in the above manner whilst using a scanning disc which can be easily manufactured and the scanning apertures of which are arranged along the circumference of a circle, or in general by making use of other known means such as, for instance, an electron-camera for the horizontal scanning (scanning in the direction normal to the film motion).

According to the invention this purpose is attained by placing a reflecting or refracting surface in the path of the light rays between the said scanning means and the film, said surface executing a rotary or oscillatory movement as result of which the reflected or refracted light ray(s) periodically acquire, during substantially the whole period of said movement, a vertical movement opposite the movement of the film.

Upon scanning a film with which the number of film pictures to be scanned per second amounts to twice the number of pictures by which the film is moved per second the vertical speed of motion of the reflected or refracted light ray(s) corresponds to the film speed at the scanning point.

Upon scanning films with which the number of film pictures to be scanned per second ($m$) is a broken multiple of the number of pictures at which the film is moved per second ($n$), the vertical speed of motion of the reflected or refracted light ray is a broken multiple $$\frac{m}{n}-1$$

of the film speed.

Figure 1:
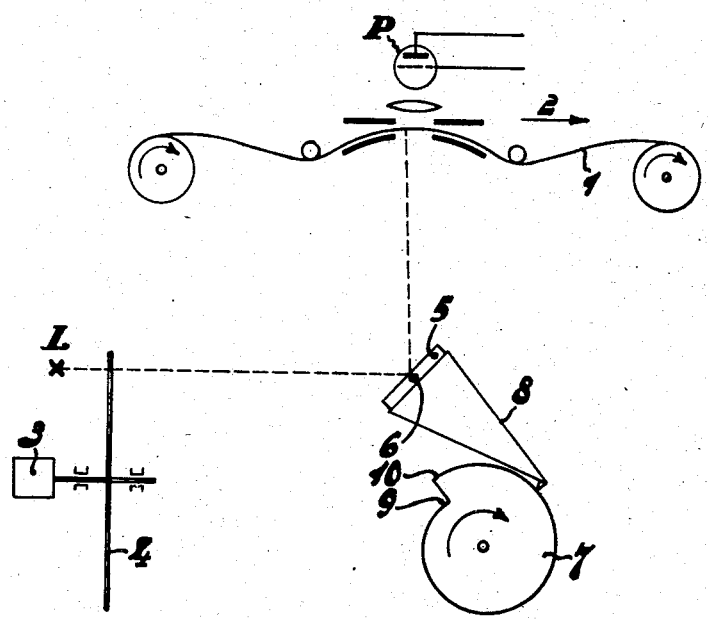
Figure 2:
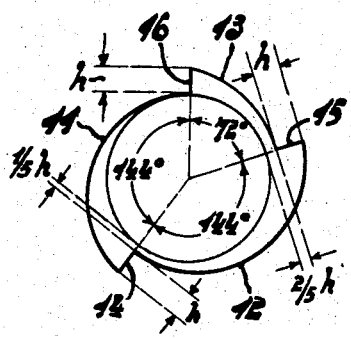

The invention will be more clearly understood by reference to the accompanying drawing in which two forms of construction are represented by way of example, and in which Fig. 1 is one embodiment of my invention, and
Fig. 2 is a cam adaptable for use in Fig. 1.

The device shown in Figure 1 is designed for scanning a film with which the number of pictures to be scanned per second is double the number of pictures at which the film is moved per second. The device comprises a film 1 which moves in the direction of the arrow 2 at a speed of, say, 25 pictures per second. The film is scanned by means of a spot of light which is projected by a light source L on to the film and receives a horizontal scanning movement normal to the direction of motion of the film by means of a scanning disc 4 which is driven from a motor 3 and furnished with apertures arranged along the circumference of a circle. The light emitted by the light source L falls through the apertures of the disc 4 on a mirror surface 5 which executes an oscillatory movement, the shaft 6 constituting the centre of rotation. This oscillatory movement is brought about by a cam disc 7 on which bears an arm 8 which carries the mirror surface 5. The circumference of the cam disc is limited by a spiral of which the beginning and the end 9 and 10 pass over into each other with a jump. Owing to the movement 8 over the cam disc 7 the mirror surface 5 executes a movement having a constant angular speed in such a manner that the spot of light projected on to the film moves in a direction opposite to that of the film. Behind the film is placed a photo-electric cell P wherein electric currents are generated whose intensity depends on the brightness of the scanned point of the film picture.

If the cam disc 25 executes 25 revolutions per second the speed of the scanning light spot amounts to 25 pictures per second at the film. The pitch of the spiral limiting the circumference of the cam disc is such that during one revolution the scanning light spot shifts at the film by a distance corresponding to the picture height. After one revolution of the disc the arm 8 arrives at the end 10 of the spiral circumference of the cam disc and then returns to the beginning 9. The mirror surface follows this movement due to which the scanning light spot flies back by one picture height.

During each revolution of the cam disc 7 the film is displaced by the height of one film picture. A similar distance, but in opposite direction, has been covered by the scanning light spot so that two film pictures A and B are scanned per revolution of the cam disc. At the end of this scanning operation the scanning light spot flies back by one film height and regains the point of departure at which the beginning of the film picture B now is. During the next revolution of the cam disc the film-picture B is scanned for the second time and the succeeding picture C for the first time, whereupon the scanning light spot flies back again by one picture-height, which is repeated. Consequently each film picture is scanned twice. If the scanning disc 4 rotates at such a speed and has such a number of apertures that the number of scanning lines is odd per two pictures, that are once scanned successively, it is ensured that the scanning lines executed upon the second scanning operation of a film-picture lie between the scanning lines executed during the preceding scanning operation, in other words the scanning of the film pictures is interlaced.

The device according to the invention may also be used for scanning a film having a number of pictures scanned per second $(m)$ which is different from the film speed $(n)$.

Such a case occurs if, for instance, the films are recorded at a speed of 24 pictures per second, whereas preferably 60 pictures are scanned per second. (60=frequency of the American A. C. mains.) The speed of the reflecting or refracting surface 5 must then be such that the scanning light spot scans one film picture per $$\frac{1}{m}$$

second. This applies if the speed of the light spot at the film surface amounts to $m-n$ pictures per second so that if $m=60$ and $n=24$ this speed corresponds to 36 pictures per second.

The scanning light spot moves per $$\frac{1}{m}$$

second at the film by a distance equal to $$\frac{1}{m}(m-n)$$

times the picture-height of the film.

This result is obtained by means of a cam-disc as shown in Fig. 2 whose number of revolutions per second $u$ corresponds to a common divisor of the speeds $m$ and $n$.

The film shifts over a distance of $$\frac{n}{u}$$

pictures per revolution of the cam disc 17 in $$\frac{1}{u}$$

second. During the same time $$\frac{m}{u}$$

pictures must be scanned and the difference $$\frac{m-n}{u}$$

pictures must be delivered by the movement of the scanning light spot.

In the case under view $u=12$ revolutions per second was chosen, so that $$\frac{m}{u}$$

is 5 and $$\frac{m-n}{u}=3$$

pictures. Accordingly the cam-disc is divided into three parts 11, 12 and 13 which successively occupy ⅖, ⅖ and ⅕ of the circumference of the cam-disc.

The part 11 of the cam-disc is traversed in 2/60 second during which time the scanning light spot covers a distance of 2/60·36=⁶⁄₅ picture height, whereas the film has meanwhile covered a distance of 2/60·24=⅘ picture height so that in this case ⁶⁄₅+⅘=2 film pictures A and B have been scanned. The height of the cam 14 is such that after scanning the pictures A and B the scanning light spot flies back by one picture-height and is then at the beginning of the picture B. After that the part 12 of the cam-disc is traversed in a time corresponding to 2/60 second. The scanning light spot and the film shift respectively by distances corresponding to ⁶⁄₅ and ⅘ times the picture-height so that the pictures B and C are scanned. The height of the cam 15 corresponds to one picture-height so that after scanning the pictures B and C the scanning light spot flies back to the beginning of the picture C. Thereupon the part 13 of the cam disc is traversed which takes place in 1/60 second. During this time the film shifts by 1/60·24=⅖ picture-height and the scanning light spot shifts by 1/60·36=⅗ picture height so that ⅖+⅗=1 picture, viz. the picture C, is scanned. Due to the cam 16 the scanning light spot flies back by one picture-height and is again at the beginning of the picture C which now occupies the place of the picture A at the beginning of the said revolution of the cam disc 17. During the next revolution the pictures C and D followed by D and E and after that E again are successively scanned.

It will be appreciated from what has been said above that of two succeeding pictures, for instance the pictures B and C, the first picture B is scanned twice and the other picture C is scanned thrice. If the scanning disc 4 rotates at such a speed and has such a number of apertures that per two pictures, which are successively scanned once, the number of scanning lines is odd, it is automatically ensured that the scanning lines executed during the second scanning operation lie between those of the first scanning operation.

In the pictures that are scanned thrice the scanning lines of two succeeding scanning operations interlace, whereas the lines executed during the third scanning operation coincide with the lines executed during one of the two preceding scanning operations.

It is not necessary that the cam disc 12 should make 12 revolutions per second; if the number of revolutions is smaller, for instance 6, the number of cams must be doubled. Instead of an oscillating mirror it is also possible to use a mirror drum in which case a parallel beam of rays is projected on to the mirror surface.

As an alternative rotating or oscillating prisms or other known surfaces may be used. In lieu of the arrangement shown in Fig. 1, in which the light source L is placed behind the disc 4 and the photo-electric cell P behind the film 1, the light source and the photo-electric cell may change places.

What I claim is:

1. An apparatus for scanning a continuously moving film comprising means for moving said film at a predeterminable rate, a source of light, means for directing said source of light onto said film, said latter means comprising a cam member having a plurality of arcuate sections each having a different radius of curvature and a pivoted reflecting member operatively associated with said cam member, means for rotating said cam, means interposed between said source of light and said pivoted means for alternately allowing the passage of a beam of elemental cross-section onto said pivoted means and cutting it off therefrom, and photoelectric means positioned adjacent said film and adapted to be energized by light directed onto said film by said pivoted means.

2. Apparatus in accordance with claim 1 wherein the length of at least one of said arcuate curves differs from the remaining arcuate curves in said cam member.

3. Apparatus in accordance with claim 1 wherein said light source comprises a light source of constant intensity and said interposed means between said light source and said pivoted means comprises a scanning disc having a plurality of apertures therein all disposed substantially the same radial distance from the center of said disc.

4. An apparatus for scanning a continuously moving film comprising means for moving said film at a predeterminable rate, a source of light, means for directing said source of light onto said film, said latter means comprising a cam member having a plurality of arcuate sections of which at least one section has a radius of curvature differing from that of the other sections and a pivoted reflecting member operatively associated with said cam member, means for rotating said cam, means interposed between said source of light and said pivoted means for alternately allowing the passage of a beam of elemental cross-section onto said pivoted means and cutting it off therefrom, and photo-electric means positioned adjacent said film and adapted to be energized by light directed onto said film by said pivoted means.

HERRE RINIA.